United States Patent
Juda et al.

(10) Patent No.: US 8,645,190 B1
(45) Date of Patent: Feb. 4, 2014

(54) PROVIDING PRICING GUIDANCE FOR CONTENT ITEMS IN PUBLICATIONS

(75) Inventors: Adam Isaac Juda, New York, NY (US); Shanmugavelayutham Muthukrishnan, New York, NY (US); Ashish Rastogi, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 509 days.

(21) Appl. No.: 12/474,132

(22) Filed: May 28, 2009

(51) Int. Cl.
*G06Q 30/00* (2012.01)
*G06F 17/00* (2006.01)

(52) U.S. Cl.
USPC .......................... 705/7.35; 705/14.4; 705/400

(58) Field of Classification Search
USPC ................. 705/14.4, 14.69, 400, 7.35, 1.1, 1
See application file for complete search history.

(56) References Cited

U.S. PATENT DOCUMENTS

| | | | |
|---|---|---|---|
| 2002/0019768 A1* | 2/2002 | Fredrickson et al. | 705/14 |
| 2002/0161625 A1* | 10/2002 | Brito-Valladares et al. | 705/10 |
| 2004/0193488 A1* | 9/2004 | Khoo et al. | 705/14 |
| 2005/0096963 A1* | 5/2005 | Myr et al. | 705/10 |
| 2007/0061196 A1* | 3/2007 | Axe et al. | 705/14 |
| 2007/0244753 A1* | 10/2007 | Grouf et al. | 705/14 |
| 2008/0103893 A1* | 5/2008 | Nagarajan et al. | 705/14 |
| 2008/0103895 A1* | 5/2008 | Burdick et al. | 705/14 |
| 2009/0216596 A1* | 8/2009 | Berry-Smith | 705/8 |
| 2010/0100422 A1* | 4/2010 | Schwarz et al. | 705/10 |
| 2011/0016003 A1* | 1/2011 | Tutone | 705/14.71 |

OTHER PUBLICATIONS

Blitstein, Ryan "Google Expands its ad Business Offline to Newspapers" Nov. 7, 2006, McClatchy-Tribune Business News.*
Pham, Alex; Johnson, Greg "Advertisers Play on Allure of Online Games" Jul. 22, 2001, Los Angeles Times, C:1.*

* cited by examiner

*Primary Examiner* — Michael Harrington
(74) *Attorney, Agent, or Firm* — Fish & Richardson P.C.

(57) ABSTRACT

Methods, systems, and apparatus, including computer programs encoded on computer storage media, for providing guidance to price content items in publications. Features of a particular content item to be published in a particular publication are received from a requestor and compared with features of content items previously published in publications. Based on the comparing, a predicted price to publish the particular content item in the particular publication is determined based on actual prices of content items previously published in corresponding publications. Then, the predicted price is provided to the requestor.

22 Claims, 5 Drawing Sheets

PROVIDING PRICING GUIDANCE FOR CONTENT ITEMS IN PUBLICATIONS

TECHNICAL FIELD

This specification relates to providing guidance for pricing content items, such as advertisements, to be included in publications.

BACKGROUND

Different types of media, such as, for example, television, radio and print, are used to present advertisements to consumers. The type of media and the features of advertisements, such as, for example, the duration of an advertisement in radio or television or the color of the advertisement in print, affect the price of presenting a particular advertisement in a particular medium. More specifically, in print media, the popularity of a publication may affect the price that a publisher seeks from an advertiser in exchange for publishing the advertiser's advertisement in the publication. The popularity may depend on factors including a number of copies of the print that are circulated, the frequency with which the publication is published, the target audience, and the region in which the publication is circulated.

Currently, publishers issue documents including prices for various advertisement options known as rate cards. The rate cards serve as guidelines based on which advertisers quote prices that they are willing to pay to publish their advertisements in a publisher's publication. A response from the publisher initiates a negotiation process. Typically, after multiple rounds of negotiation, the advertiser and the publisher agree upon a price. The advertiser and the publisher can negotiate via inter-connected computer systems that are operatively coupled to each other through one or more networks, such as, for example, the Internet.

In one example, the advertiser makes an offer of payment to publish an advertisement that is transmitted to the publisher. In response, the publisher either accepts the offer, or rejects and provides a counter-offer. Eventually, the advertiser and the publisher agree upon a price. Alternatively, the publisher does not publish the advertisement because the negotiating parties could not agree upon a price.

SUMMARY

This specification describes technologies relating to providing guidance to price content items in publications. In one example, features of an advertisement including a description indicating if the advertisement is in color or grayscale, a section of a publication in which the advertisement is to issue, and dimensions of the advertisement are received from an advertiser intending to publish the print advertisement in a publication, such as a newspaper. The received features are compared with features of advertisements that have previously been published in multiple publications (e.g., multiple newspapers). Based on the prices of the previously published advertisements, a price that the advertiser can expect to pay to publish the advertiser's particular advertisement in the publisher's particular publication is predicted. To make the prediction, support vector regression analysis based on a radial basis kernel function is performed with the output of the regression analysis being the predicted price. The predicted price represents an aggregate metric based on the prices of the previously published advertisement. An advertiser can decide either to offer to pay the predicted price to the publisher or to use the predicted price as a basis to infer a meaningful price.

The advertiser provides the predicted price or the meaningful price inferred from the predicted price or any offer price to the publisher. The pricing transaction is completed when the advertiser and the publisher agree upon a price to publish the particular advertisement in the particular publication. The price upon which the advertiser and the publisher agree is used in subsequent support vector regression analysis for future predictions of advertisement prices.

In one aspect, one or more features of a particular content item to be published in a particular publication are received from a requestor, with each feature affecting a price of publishing the content item. The received features are compared with features of content items previously published in publications. The features for each previously published content item include an actual price for publishing the content item in a corresponding publication. Based on the comparing, a predicted price to publish the particular content item in the particular publication is determined based on actual prices of one or more content items previously published in one or more corresponding publications. Each of the one or more previously published content items has at least one feature that is substantially similar to the one or more features of the particular content item. The predicted price is provided to the requestor.

This, and other aspects, can include one or more of the following features. The particular content item can include an advertisement and the requestor can include an advertiser. A determination may be made that the advertiser has offered to pay a price similar to the predicted price to a publisher of the particular publication to publish the advertisement, a particular price agreed upon by the advertiser and the particular publisher to publish the particular advertisement may be determined, and the particular price may be included in the one or more features of the particular advertisement. The price similar to the predicted price can be the predicted price itself. The particular advertisement may be included in the content items, the particular publication may be included in the publications, and the one or more features of the particular advertisement may be included in the features of the content items.

The actual prices of the previously published content items can be obtained by tracking pricing negotiations between entities providing the content items and publishers of the publications in which the content items are published, and the prices agreed upon by the publishers and the entities to publish the content items in the publications may be stored as agreed prices.

The comparing can include dividing the publications into groups, with each group including one or more publications, features associated with content items previously published in the one or more publications and actual prices of the previously published content items. A particular group can include the particular publication, the particular content item, and the one or more features.

Support vector regression analysis based on radial basis function kernels may be performed on the groups. An output of the support vector regression analysis can be the predicted price. One of the groups can be a test group and remaining groups can be training groups. The test group can exclude the particular publication. The publications in each group can be distinct from each other.

In another aspect, a system includes a receiver to receive features of a particular content item. Each feature affects a price of publishing the content item in a particular publication, and a particular publication in which the particular content item is to be published. The receiver also receives a request to determine a predicted price required to publish the particular content item in the particular publication. The system additionally includes a processor to determine a predicted price to publish the particular content item in the particular publication based on actual prices of content items previously published in corresponding publications. One or more of the previously published content items has corresponding features identical to the features of the particular content item. The system further includes a transmitter to transmit the predicted price in response to receiving the request.

This, and other aspects, can include one or more of the following features. The system can further include a repository to store the features of the content items including the features of the particular content item, the publications including the particular publication, the agreed prices, and the predicted price. The system can further include a price receiver to receive a price agreed upon to publish the particular content item in the particular publication. The repository can store the price agreed upon.

To determine the predicted price, the processor can perform operations including dividing the publications into multiple groups such that each group includes features of one or more content items previously published in one or more publications included in the group and agreed prices for the one or more content items. A particular group can include the particular publication and the features of the particular content item. The processor can additionally perform operations including selecting a group of the plurality of groups as a test group, selecting remaining groups as training groups, and performing support vector regression analysis on multiple groups. An output of the support vector regression analysis can be the predicted price. The publications in each group can be separate and distinct from each other. Performing support vector regression analysis on the multiple groups can further include creating a group that does not include the particular publication, and selecting the created group as the test group.

The features can include an appearance of the particular content item. The appearance can include one or more of a color, a column count, and a height of the particular content item. The features can include features of the particular publication. Such features can include a section, a category, an issue day, an issue type, and a circulation number of the particular publication. The content item can be a print advertisement.

In another aspect, a computer-readable medium tangibly encoding software instructions executable to cause one or more computers is described. The instructions cause the one or more computers to perform operations including determining agreed prices to publish multiple content items in corresponding multiple publications. Each content item is associated with a multiple features. The operations include receiving features of a particular content item for publishing in a particular publication, receiving a request to determine a predicted price to publish the particular content item in the particular publication, performing support vector regression analysis comparing features of the particular content item and features of the multiple content items with each other, where each features of a content item affects a price of publishing, and wherein an output of the support vector regression analysis is the predicted price, and providing the predicted price in response to the request.

This, and other aspects, can include one or more of the following features. For example, determining agreed prices can include, for each content item previously published in a corresponding publication, tracking pricing negotiations between an advertiser providing each content item and a publisher of the corresponding publication, and receiving a price agreed upon pursuant to the negotiations. The operations can further include detecting an offering of the predicted price as an offer price to publish the particular content item in the particular publication, tracking negotiations to arrive at a particular price to publish the particular content item in the particular publication, and determining an error between the predicted price and the agreed price.

Particular implementations of the subject matter described in this specification can be implemented so as to realize one or more of the following potential advantages. Providing a predicted price to publish an advertisement in a publication can improve transparency between advertisers and publishers. Further, providing the predicted price can decrease, and can possibly eliminate, the need for advertisers and publishers to negotiate prices on a case by case basis. Because both advertisers and publishers are provided with a typical price, advertisers can be encouraged to make offers to publishers. If the advertisement or publication is atypical, then advertisers and publishers can use the typical price as a basis to commence negotiations to publish typical and atypical advertisements in typical and atypical publications. Conversely, because publishers are confident that a price offered by an advertiser may not be inappropriately low, publishers are encouraged to quickly accept received offers. In addition, pricing guidance can help both the publisher and the advertiser to determine if effort needs to be expended in negotiations. For example, if a predicted price significantly exceeds an advertiser's budget for publishing an advertisement in a particular publication, the advertiser may choose not to negotiate with the publishers of the particular publication, but may select an alternative publication instead. Furthermore, guidance can protect the advertiser from over-paying for an advertisement. In this manner, market efficiency can be increased. By predicting prices based on previously accepted prices, prices accepted from any advertiser by any publisher can be standardized.

The details of one or more implementations of the subject matter described in this specification are set forth in the accompanying drawings and the description below. Other features will become apparent from the description, the drawings, and the claims.

BRIEF DESCRIPTION OF THE DRAWINGS

Like reference numbers and designations in the various drawings indicate like elements.

DETAILED DESCRIPTION

Inter-connected computer systems enable advertisers and publishers of print media to negotiate prices for publishing advertisements provided by advertisers in publications printed by publishers. For example, over one or more networks, such as the Internet, an advertiser transmits a price to publish a particular advertisement having multiple features in a particular publication also having multiple features. Each feature of both the advertisement and the publication affect a price for which the publisher will publish the advertisement in the publication. The publisher of the particular publication receives the price and, through the Internet, either transmits an agreement indicating that the received price is acceptable or transmits a counter-offer including a revised price. In this manner, the publisher and the advertiser negotiate through the Internet to agree upon a price for which the particular advertisement will be published in the particular publication.

The negotiations are tracked by receiving prices from the advertiser and the publisher, and providing the same to the other party. In some implementations, the multiple features of the particular advertisement, those of the particular publication, all prices provided and received by the publisher and the advertiser during negotiations, and the price to which both the publisher and the advertiser agreed are stored. By extension, the above-described information obtained from several negotiations between several advertisers and publishers is also stored. Using techniques described below, the stored data is used to predict a price that an advertiser can expect to pay to publish a particular advertisement having multiple features in a particular publication having corresponding features. The predicted price guides the advertiser to quote an offer price to the publisher. A system that provides such guidance to the advertiser to price advertisements is explained with reference to FIG. 1.

Figure 1:
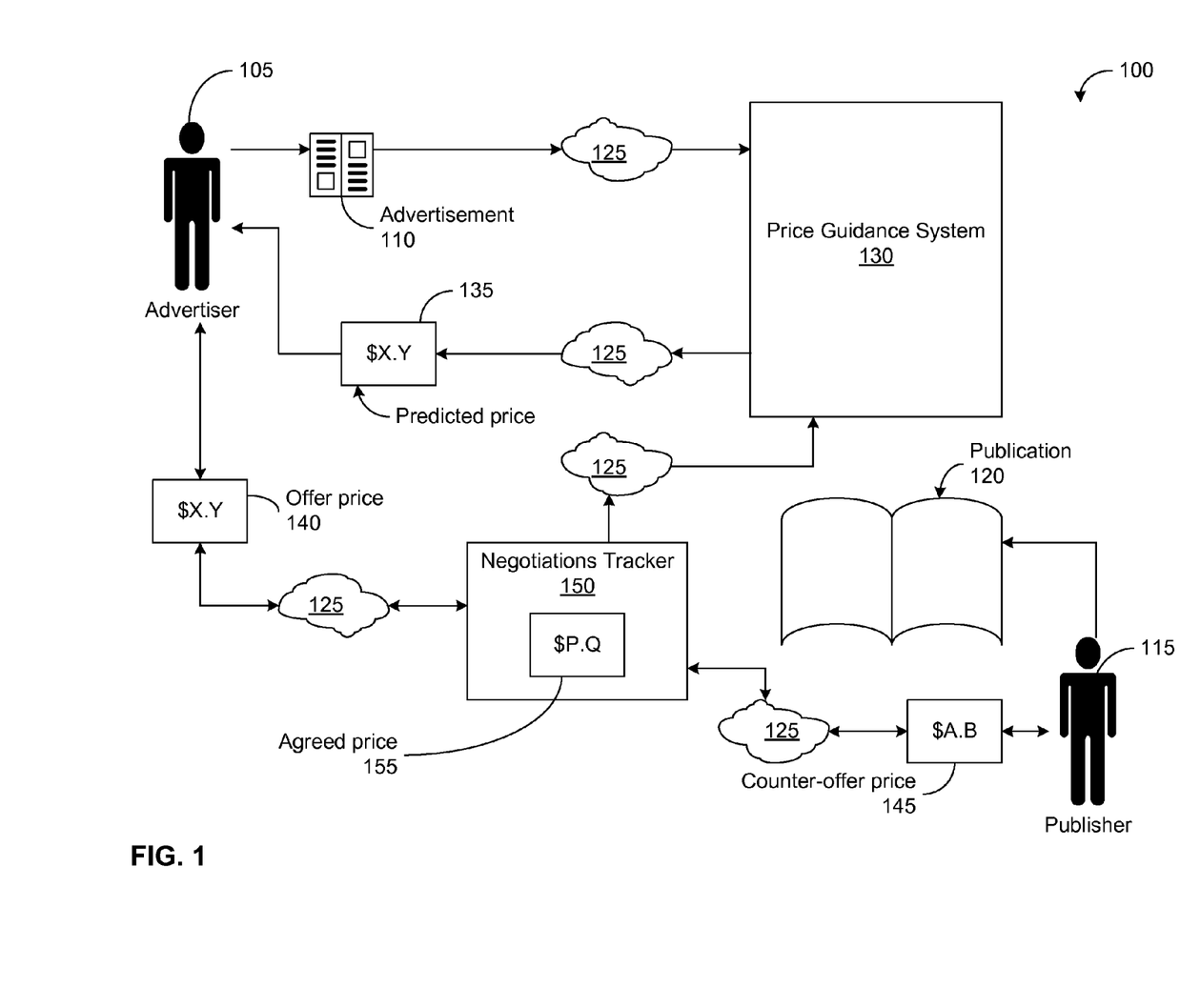
FIG. 1. is an example of a system for providing guidance to price content items.

FIG. 1 is an example of a system 100 for providing guidance to price content items. Generally, an advertiser 105 who intends to advertise products and/or services through an advertisement 110 in a print publication 120 communicates with a publisher 115 of the publication 120 using computer systems, for example, desktop computers, laptop computers, personal digital assistants (PDA), and the like, operatively coupled to each other through one or more networks 125, such as the Internet. The system 100 includes a price guidance system 130 that provides guidance to the advertiser 105 to quote a price for publishing the advertisement 110 in the publication 120, such that the quoted price is substantially close to the price that the publisher 115 will accept to publish the advertisement 110.

In some implementations, the advertiser 105 identifies features of the advertisement 110 including color, column count, height, and the like, and transmits the features to the price guidance system 130 through the network 125. Additional features that the advertiser 105 can identify include the day of the week that the publication in which the advertisement 110 is to be published issues, the section of the publication in which the advertisement 110 is to be published, the circulation of the publication, the type of publication, such as, for example, free daily or college weekly, or combinations of the features.

Using techniques described later, the price guidance system 130 provides a predicted price 135 to the advertiser 105. The advertiser 105 quotes the predicted price 135 as an offer price 140 to the publisher 115. The advertiser 105 can, alternatively, quote a price different from the predicted price 135 as the offer price 140 to the publisher. For example, the advertiser 105 can quote a price that is lower than the predicted price 135. In some implementations, to enable the advertiser 105 to quote the offer price 140, the system 100 includes a negotiations tracker 150, operatively coupled to the advertiser 105 and the publisher 115, that receives the offer price 140 from the advertiser 105, and transmits the same to the publisher 115. The publisher 115 can either agree to publish the advertisement 110 for the received offer price 140 or can provide a counter-offer price 145 to the advertiser 110. The negotiations tracker 150 receives the counter-offer price 145 and transmits the same to the advertiser 115. The system 100 stores the offer price 140, the counter-offer price, and all other prices exchanged by the advertiser 105 and the publisher 115 during the negotiations until both parties reach an agreed price 155 for which the publisher 115 will publish the advertisement 110 in the publication 120.

Notably, the negotiations tracker 150 is operatively coupled to the price guidance system 130 such that all prices during the negotiation are transmitted to the price guidance system 130 through the network 125. As described with reference to FIG. 4, the price guidance system 130 uses machine learning to model the price of publishing the advertisement 110 as a function of features of an advertisement using machine learning techniques. In some implementations, using support vector regression based on a radial basis kernel function, the price guidance system 130 learns a hypothesis function whose arguments are the features of the advertisement 110, and the output of which is the predicted price 135.

The support vector regression analysis operates under the hypothesis that a publisher of a publication having multiple features will accept a price to publish an advertisement having corresponding multiple features. The analysis includes comparing a price with prices previously accepted by publishers to publish advertisements in publications. If the difference between the previously accepted prices and the compared price is statistically not significant, then the hypothesis is validated, and the compared price is considered a good starting price that the advertiser can quote. Conversely, if the difference is statistically significant, then the hypothesis is rejected, and the compared price is not a good starting price to quote to a publisher.

By collecting offer prices 140, counter-offer prices 145, and agreed prices 155 in transactions between multiple advertisers 105 and multiple publishers 115, the hypothesis function of the pricing guidance 130 is continuously updated. The support vector regression analysis uses the updated data to make subsequent price predictions. In this manner, the price guidance system 130 in which the regression analysis can be implemented continuously learns to predict prices based on updated hypotheses. The operation of the price guidance system 130 in a transaction involving one advertiser 105 and one publisher 115 is explained with reference to FIG. 2. Based on the following description, transactions between multiple advertisers and corresponding publishers can be extrapolated.

Figure 2:
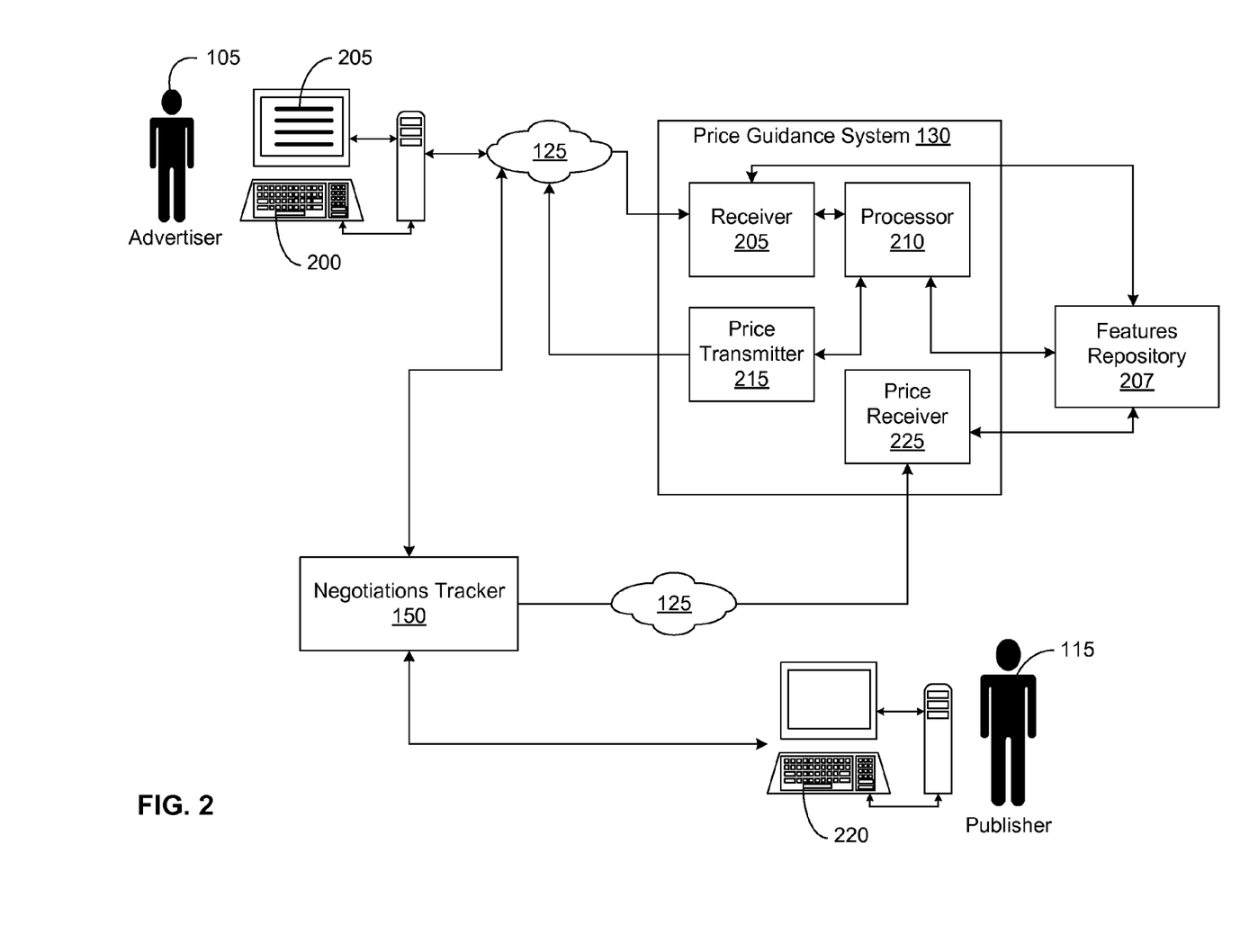
FIG. 2 is an example of a price guidance system that provides cost per mille per column inch (CPMPCI).

FIG. 2 is an example of a price guidance system 130 that provides cost per mille per column inch (CPMPCI). The price guidance system 130 can predict the cost to publish an advertisement per column inch of a publication, for example, a newspaper, that has a circulation of one thousand. In some implementations, using a computer system 200, such as, for example, a desktop computer, a laptop computer or a PDA, the advertiser 105 transmits features of a particular advertisement 110 to be published in a particular publication 120 to the price guidance system 130. In addition to providing features of the particular advertisement 110, the advertiser 105 can provide features of the particular publication 120 in which the advertisement 110 is to be published, for example, the publication name, a location in the publication 120 such as a section name, a category name, and the like, in which the advertisement 110 is to be published, a day of issue, a type of issue, such as, daily, weekly, bi-weekly, and the like, a circulation indicating a number of publications that are circulated in the market, and the like.

The price guidance system 130 includes a receiver 205 that receives the multiple features from the advertiser 105, each of which affects a price of publishing the particular advertisement 110 in the particular publication 120, and a request to determine a predicted price required to publish the particular advertisement 110 in the particular publication 120. The receiver 205 is configured to transmit the features to a features repository 207 in which the features are stored. In some implementations, the features can be stored in a computer-readable table. For example, each advertiser 105 who provides features is assigned a row in the table in the repository 207 and each feature provided by the advertiser is stored as an entry in a cell in the row.

In some implementations, the price guidance system 130 includes a processor 210 that determines a predicted price to publish the particular advertisement 110 in the particular publication 120 based on actual prices of advertisements previously published in corresponding publications. At least one of the previously published advertisements have corresponding features that are substantially similar to the features of the particular advertisement 110. For example, one of the multiple features received from the advertiser 105 is that the particular publication 120 has a circulation of 5000. The features of the previously published advertisements include substantially similar circulations of 4000 and 6000. Alternatively, one of the previously published advertisements has corresponding features that are identical to the features of the particular advertisement 110. The features of the previously published advertisements can be collected and transmitted directly to the features repository 207. Alternatively, or in addition, the features of the previously published advertisements can be obtained from the negotiations tracker 150. In addition to storing features of the advertisement, the features repository 207 also receives the price agreed upon by the advertiser 105 and the publisher 115, and the number of iterations before which the price was agreed, and stores both features along with the features of the advertisement.

To provide the advertiser 105 with a predicted price to offer as a price to the publisher 115, the processor 210 considers two measures: x[i] which is a description of the ith offer, and y[i] which is the corresponding accepted price (accepted CPMPCI). Note that not all offers will have corresponding accepted prices. For example, if after the advertiser makes an offer, the parties do not agree upon a price, then the negotiations end; yet, there is no corresponding accepted price for the offer. For n iterations between the advertiser 105 and the publisher 115, the index i runs from/to n. The output of the processor 210 is a prediction p[i] for the ith offer. From the prediction, p[i], the processor 210 can determine two errors: (i) mean absolute error, which is the average of $|p[i]-y[i]|$ that denotes the average number by which the predicted price differs from the accepted price; and (ii) mean squared error, which is the average of $(|p[i]-y[i]|)^2$ that denotes the standard error that the processor 210 uses when the processor 210 casts the problem of determining the predicted price as a regression problem. To predict a price of the advertisement, the processor 210 performs regression analysis on the features of the particular advertisement 110 and the features of the advertisements stored in the features repository 207 to minimize the mean squared error, as described with reference to FIG. 4.

The price guidance system 130 includes a price transmitter 215 that is operatively coupled to the processor 210 to transmit the output from the processor 210, namely, the predicted price, to the advertiser's computer system 205 through the network 125, for example, for display in a user interface. The advertiser 105 can provide the predicted price received from the price guidance system 130, or a different price, to the publisher 115 through the negotiations tracker 150. The price guidance system 130 includes a price receiver 225 that receives the prices provided by the advertiser 105 and the publisher 115 to each other from the negotiations tracker 150. The price receiver 225 transmits the received price to the features repository 207.

The price guidance system 130 receives an indication from the negotiations tracker 150 that the advertiser 105 and the publisher 115 have agreed upon a price. Upon receiving the indication, the price guidance system 130 stores the accepted price in the features repository 207, for example, in the row in which the features of the advertisement 205 are stored. In subsequent requests from an advertiser 105 to provide a predicted price for an advertisement having particular features, the processor 210 uses the features in the features repository 207, for example, to minimize the mean squared error using support vector regression.

The steps performed by the price guidance system 130 are described with reference to FIG. 3. Although the price guidance system 130 describes predicting a price for publishing an advertisement in a print publication, the steps performed by the system 130 can be used to predict the price for printing any content item in a print publication. In addition to advertisements for products and services received from advertisers, such content items can include information published in classifieds, and the like.

Figure 3:
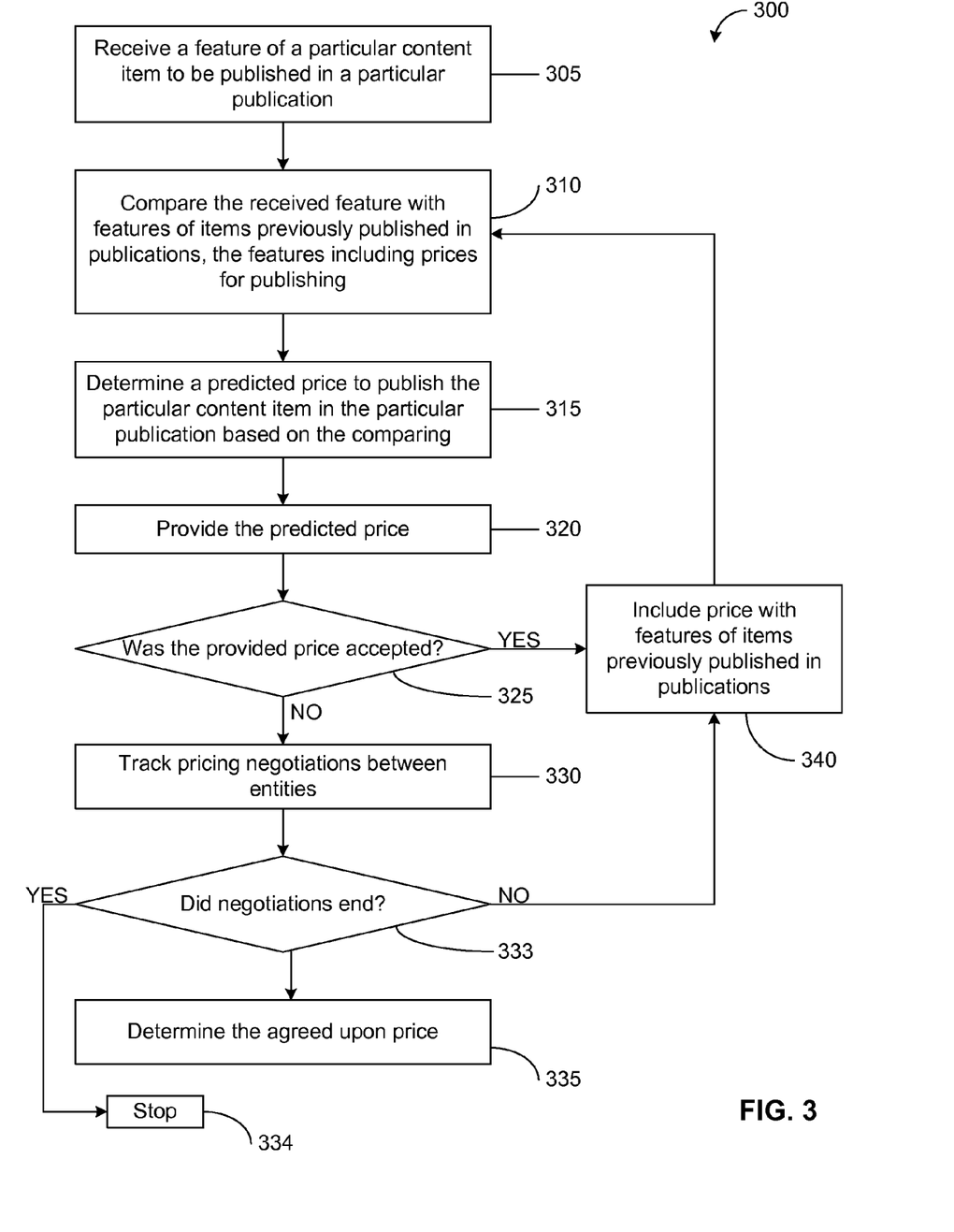
FIG. 3 is an example of a process for providing a predicted price to publish a content item in a printed publication.

FIG. 3 is an example of a process 300 for providing a predicted price to publish a content item in a printed publication. The process 300 receives a feature of a particular content item to be published in a particular publication (step 305). The process 300 compares the received features with features of items previously published in publications (step 310). The features include prices for publishing the content item in the publications. Based on the comparing, the process 300 determines a predicted price to publish the particular content item in the particular publication (step 315). To do so, the process 300 bases the predicted price on actual prices of one or more content items previously published in one or more corresponding publications. Each of the previously published content items have at least one feature that is the same as the feature of the particular content item. The process 300 provides the predicted price (step 320). For example, along with the features, the process 300 receives a request for the predicted price and provides the same in response to the request.

The process 300 checks to determine if the provided price was accepted (step 325). For example, the process 300 determines that the requestor has provided the predicted price as an offer price to a publisher, tracks the negotiations between the requestor and publisher, and determines if the publisher has accepted or rejected the price. If the price is accepted, the process 300 includes the price with features of items previously published in publications as the price upon which the requestor and the publisher agreed (step 340). If the price is rejected, then the process 300 tracks pricing negotiations between the requestor and the publisher (step 330). Parties may cease negotiations at the end of the first price-exchange or after one or more rounds of negotiations. The process 300 checks if negotiations ended (step 3330). If yes, then the process 300 stops at 334. If not, then the process 300 determines the price to which both parties agree (step 335), and then includes the price with the features of the content items (step 340). In some implementations, the process 300 can include all prices quoted during the negotiations by both parties prior to the end of negotiations in the features of items previously published in publications. In some scenarios, features of items that were not published because parties did not agree upon a price can also be used to train the price guidance system 130 to provide a predicted price. In some implementations, the price guidance system 130 implements process 300, and more specifically, implements support vector regression based on radial basis kernel functions to determine the predicted price, as explained with reference to FIG. 4.

Figure 4:
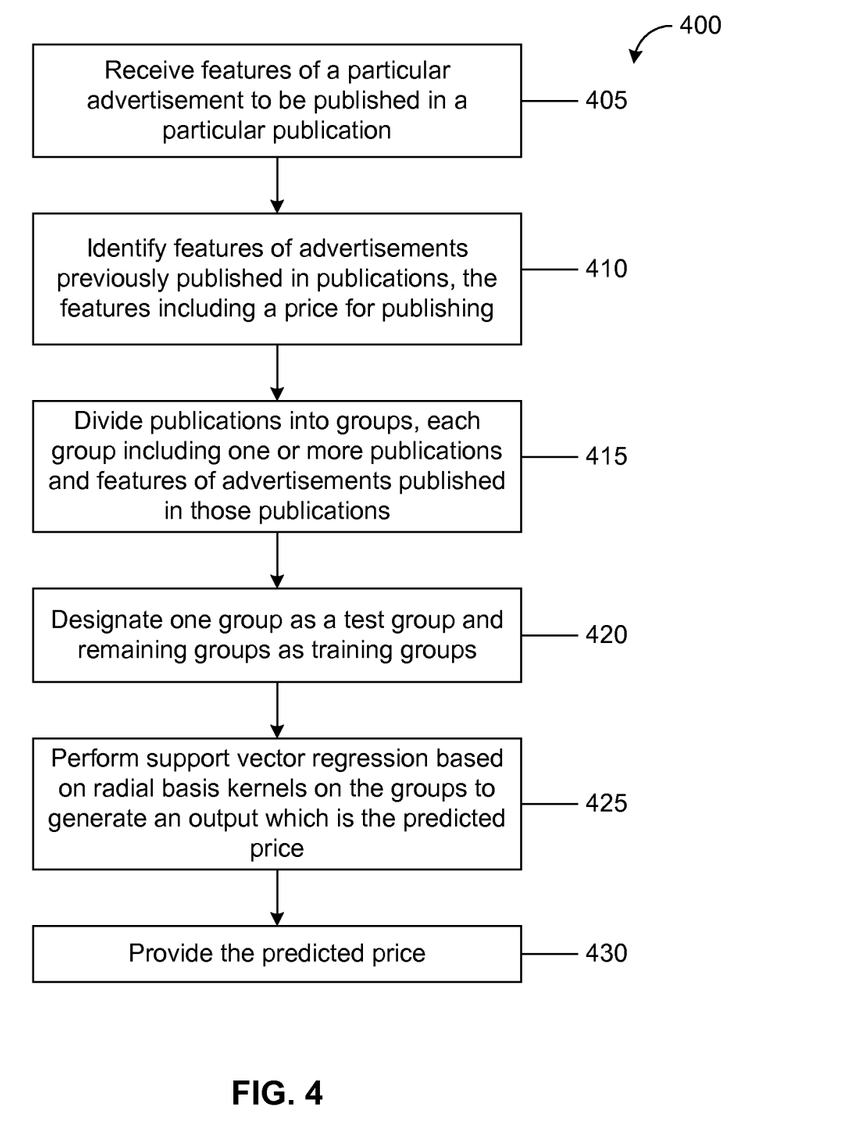
FIG. 4 is an example of a process for predicting a price of an advertisement using support vector regression analysis.

FIG. 4 is an example of a process 400 for predicting a price of an advertisement using support vector regression analysis. The process 400 receives features of a particular advertisement to be published in a particular publication (step 405). In some implementations, the features include one or more of an advertisement color, a publication section name, a publication category name, a publication day of issue, a publication type of issue (Sunday issue, week day issue, and the like), an advertisement column count, an advertisement height, a publication circulation (between 0 and 1,000, between 1,000 and 2,000, and the like), whether the publication is a college publication, demographic information about the publication's target audience, any pre-negotiated contracts between the advertiser and the publisher, and the like. The process 400 identifies features of advertisements previously published in publications (step 410), for example, from the features repository 207. The identified features include a price of the previously published advertisements.

The process 400 divides publications into groups (step 415). The publications include those in which advertisements were previously published as well as the particular publication in which the advertiser intends to publish the particular advertisement. Each group includes one or more publications and features of the advertisements published in those publications. In some implementations, the number of groups into which the publications are divided depends on the total number of available publications. The predicted price is based on the features of publications in each group. As a result, the number of publications in a group is greater than a threshold. For example, the number of publications in each group can be a fraction of the total number of available publications. In such scenarios, the number of groups into which the process 400 divides the publications is fixed. In an alternative example, the number of publications in a group can be fixed. In such scenarios, the number of groups into which the process 400 divides the groups can increase as distinct publications are added to the available publications.

In some scenarios, the process 400 divides the publications into two groups. To do so, the process 400 associates a numerical identifier with each publication. Then, the process 400 includes all publications associated with an even numbered identifier in a first group and all publications associated with an odd numbered identifier in a second group. In some implementations, using the numerical identifier associated with the publications, the process 400 divides the publications into ten groups. In general, to divide the publications into groups, the process 400 divides the numerical identifier by the total number of groups and includes a publication in a group based on the reminder of the division. While in some implementations, each group has the same number of publications, alternatively, the number of publications in each group is not the same across the groups. Also, the manner in which the process 400 distributes publications into groups ensures that each group has distinct publications that are not in any other group. Dividing publications into groups, each of which includes distinct publications, ensures anonymity of publications as described later.

The process 400 designates one group as a test group and the remaining groups as training groups (step 420). Each group has an associated pricing model that is trained based on features of publications in that group as well as in the other groups. Based on the training model, the process 400 learns to predict a price of an advertisement that has certain features. Each training model is based on a radial basis function (RBF) kernel, and the multiple training models are then combined using support vector regression. A RBF kernel is a popularly used similarity measure that represents a "dot product" in some high dimensional feature space. In some implementations, the RBF kernel represented by equation (1) forms the basis for the support vector regression:

$$K(x, y) = \exp\left(-\gamma \cdot \sum_{i=1}^{N} (x_i - y_i)^2\right) \quad (1)$$

In equation (1), $K(x,y)$ represents a similarity between variables x and y. Each of x and y represents features of advertisements. Each advertisement has a total of N features. For example, $x_1$, $x_2$, and $x_3$ represent column height, advertisement height, and publication circulation for a first advertisement. Similarly, $y_1$, $y_2$, and $y_3$ represent column height, advertisement height, and publication circulation for a second advertisement. The similarity function of equation (1) provides an output that indicates a similarity between the two advertisements. If the two advertisements are identical, then the respective features of the advertisements are identical, and consequently, $(x_1, x_2, x_3)=(y_1, y_2, y_3)$, and $K(x,y)=1$. If the two advertisements are entirely dissimilar, then $K(x,y)=0$. Depending upon the level of similarity between the two advertisements, the value of $K(x,y)$ ranges between 0 and 1.

In some implementations, using the RBF kernel, the process 400 compares features received from an advertiser requesting a price prediction with those that were previously published in publications to determine identical advertisements, similar advertisements, and dissimilar advertisements. By support vector regression, the process 400 trains the pricing model of each group based on the similarities of advertisements within the group to the received advertisement and to each other.

To train the pricing models, the process 400 designates one group as a test group and remaining groups as training groups (step 420). From within the training groups, represented by x, the process 400 selects a set of support vectors, represented by s. For example, if the training set includes 10,000 advertisements in publications and associated features, then the support vectors can include some 2,000 advertisements of the 10,000 advertisements, picked by the algorithm.

Each support vector, x[i], in s has a corresponding weight, $\alpha[i]$, with i in $\{1, \ldots, m\}$. The weight for each support vector is proportional to the corresponding CPMPCI of the support vector, and also captures the relative importance of point/ determined by the solution of the support vector regression algorithm that attempts to minimize a combination of training error and the capacity of the prediction function to prevent overfitting.

The process 400 performs support vector regression based on RBF kernels on the groups to generate an output which is the predicted price (step 425). Having identified the support vectors and corresponding weights, the process 400 predicts a price of a new advertisement having corresponding features using a function represented by equation (2).

$$f(x) = \sum_{i=1}^{m} \alpha_i K(x, x_i) - \rho \quad (2)$$

Equation (2) represents an SVM algorithm in which $f(x)$ represents the predicted price of the new advertisement represented by x. The function, $K(x, x_i)$ is based on the RBF kernel function of equation (1).

In general, kernel functions are dot products that, in a simple form, can be represented as:

$$K(x,y) = x_1 y_1 + x_2 y_2 + x_3 y_3 + \ldots + x_N y_N$$

The above-denoted simple form is a basic dot product representation. Let <x, y> denote this simple form of a kernel function. If points $(x_1, x_2, \ldots, x_N)$ and $(y_1, y_2, \ldots, y_N)$, termed "features" for points x and y, are mapped to higher dimensional feature-spaces, then more complicated kernel functions, K(x,y), for example, the kernel function represented by equation (1), can be obtained. According to the theory of positive semi-definite kernel functions, so long as the function, K(x,y), is positive semi-definite, there exist mappings θ(x) and θ(y). In some arbitrary high dimensional feature spaces, K(x,y)=<θ(x), θ(y)>. In other words, [θ(x_1), θ(x_2), θ(x_3), . . . , θ(x_N)] and [θ(y_1), θ(y_2), θ(y_3), . . . , θ(y_n)] are features for points θ(x) and θ(y).

The features of the new advertisement, x, are compared with the features of each of the previously published advertisements included in the support vectors, $x_i$. To this similarity function, the weights, $w_i$, of the support vectors and a bias term, ρ, are included. The SVM algorithm represented by equation (2) is an objective function which performs two functions: (i) minimization of a training error; and (ii) regularization.

The training error represents errors between a price predicted by equation (2) and an actual price accepted by the publisher that need to be minimized. For example, if an advertisement includes three features, namely, A, B, and C, then a simple equation to determine a predicted price for the advertisement can be:

$$<(x,y,z),(A,B,C)> = \text{Price} \qquad (3)$$

In the above equation, "< >" represents a dot product between weights (x,y,z) and features (A,B,C). The features A, B, and C in equation (3) can be used to perform operations in arbitrary high dimensional spaces. For example, the feature space can be mapped to six dimensions by using products AB, BC, and AC, in addition to A, B, and C. The prediction function has a general form that there is a weight, w, in the high dimensional feature space, and the prediction function f(x)=K(x,w)+b, where b is a bias term. The form of the prediction function indicates that w is a weighted sum of the various support vectors in the high dimensional feature space. RBF kernels can result in infinite feature spaces and consequently may not always permit feature mapping. The second objective of the SVM algorithm, i.e., regularization, limits the ability to choose values of the predicted variables freely to increase the learning capability of the SVM algorithm and to decrease the memorization tendency of the algorithm. By doing so, the SVM algorithm computes a predicted price that is close to an accepted price based on previous advertisements, rather than memorizing prices and retrieving a memorized price for a set of features of an advertisement. In this manner, the SVM algorithm of equation (3) provides a predicted price. The process 400 provides the predicted price, for example, to the advertiser (step 430).

While the price guidance system 130 is described with reference to a particular advertiser 115 and a particular publisher 120, the system 130 is configured to receive features from and provide predicted prices to multiple advertisers 115 simultaneously. Additionally, the system 130 is configured to track multiple negotiations between advertisers and publishers simultaneously, to receive and store prices offered and counter-offered during the negotiations, and to receive and store accepted prices in the features repository 207. In some implementations, the features repository 207 can be external to the price guidance system 130 and can be operatively coupled to the system 130 through one or more wired or wireless networks.

Figure 5:
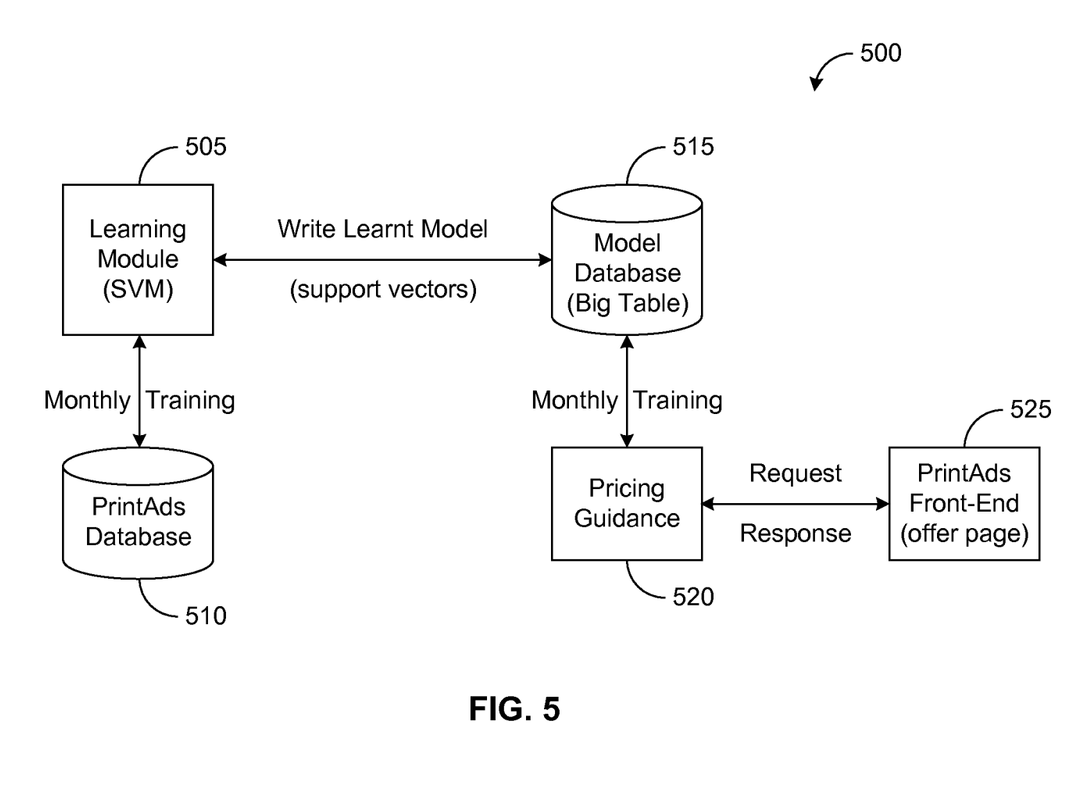
FIG. 5 is an example of an architecture of a system for providing guidance to price print advertisements.

FIG. 5 is an example of an architecture of a system 500 for providing guidance to price print advertisements. In some implementations, a learning module (SVM) 505 is operatively coupled to a PrintAds Database 510. At a regular frequency, for example, monthly, the learning module (SVM) 505 is trained to predict prices of advertisements having features based on the advertisements in the PrintAds Database 510. The learnt model is written to a model database 515, for example, in a computer-readable big table. At a regular frequency, for example, on a monthly basis, the model in the model database 515 communicates with pricing guidance 520 to provide a predicted price upon receiving new features from a PrintAds Front-End 525. Further, the pricing guidance 520 provides a predicted price to the front-End 525.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of the subject matter or of what may be claimed, but rather as descriptions of features specific to particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. For example, in some implementations, the advertiser can provide features of the advertisement and of a publication. In response, the price guidance system 130 can provide multiple publications having the features specified by the publisher and a predicted price to publish an advertisement in each of the multiple publications.

In some implementations, the price guidance system 130 can be configured to remove duplicate features of the same advertisement or the same publication or both from the data stored in the features repository 207. By doing so, the price guidance system 130 considers only unique records.

In some implementations, the price guidance system 130 is configured to ignore certain prices received from the negotiations tracker 150. For example, an initial offer price provided by the advertiser to the publisher or an initial acceptable price provided by the publisher to the advertiser can be so significantly different from the actual price or the predicted price that including the price in the training set will cause the mean squared error to be high. In such scenarios, the price is treated as noise and ignored. For example, a maximum threshold CPMPCI is selected, e.g., $10.0, and all values of CPMPCI greater than the threshold are treated as noise and ignored. In some implementations, for numerical stability, a logarithm of the circulation is treated as a feature of the publication.

In some implementations, the groups are divided into a test group and training groups such that each group includes distinct publications. When an advertiser provides features of a particular advertisement that are to be provided in a publication that is included in a group, that group is treated as the test group and the remaining groups are treated as the training groups. Doing so ensures advertiser anonymity in that the SVM algorithm is unaware of the previous pricing trends of the publication in which the particular advertisement is to be published. Thus, any intentional deviation in the pricing trend of the publication, that is collected through the negotiations tracker, does not affect the predicted price because the pricing trend is not included in the training set from which the predicted price is generated. In this manner, anonymity of publishers is ensured for pricing purposes.

In some implementations, a predicted price can be generated in the absence of support vector regression analysis and by relying on prices of past advertisements alone. In such implementations, the advertiser provides the features of a publication in which the advertiser wishes to publish the particular advertisement. The features include whether the publication should be in color or black/white, a circulation of the publication, and whether or not the publication publishes on a Sunday. To predict a price, the price guidance system 130 first generates a table including color, minimum number of the publication in circulation, maximum number of the publication in circulation, and a type (Sunday publication or non-Sunday publication) of multiple publications. Then, the price guidance system 130 populates each row of the table with data obtained from advertisements previously published in publications. For example, the system 130 includes in one row, data indicating that 106 advertisements were previously published in a Black/White publication having a circulation between 0 and 10,000 that is published on Sundays, and that a median price of the 106 advertisements is $0.75. Similarly, the system includes in another row, data indicating that 33 advertisements were previously published in a color publication having a circulation between 50,000 and 100,000, and that a median price of the 33 advertisements is $0.38. When the advertiser provides features of the particular publication, the price guidance system 130 identifies the row in the table that matches the features of the particular publication, and retrieves the median price associated with that row. The system 130 provides the retrieved median price as the predicted price to the advertiser.

What is claimed is:

1. A method comprising:
receiving, by one or more data processing apparatus, from a requestor a plurality of features of a particular content item to be published in a particular physical publication, each feature affecting a price of publishing the particular content item in the particular physical publication, the plurality of features including physical features of the particular content item;
identifying, by the one or more data processing apparatus, physical features of a plurality of content items previously received from a plurality of requestors and previously published in a plurality of physical publications by a plurality of publishers, wherein each of the plurality of previously published content items is associated with an actual price previously accepted by a corresponding publisher for publishing the previously published content item in a corresponding physical publication;
comparing, by the one or more data processing apparatus, the physical features of the particular content item with physical features of the plurality of previously published content items to identify one or more previously published content items of the plurality of previously published content items that have at least one physical feature that is substantially similar to at least one physical feature of the particular content item, wherein the comparing includes dividing the plurality of physical publications into groups;
based on the comparing, determining, by the one or more data processing apparatus, a predicted price to publish the particular content item in the particular physical publication, the determining including performing support vector regression analysis based on radial basis function kernels on the groups and minimizing an error between the predicted price and actual prices previously accepted by one or more of the plurality of publishers for publishing the one or more previously published content items that have at least one physical feature that is substantially similar to at least one physical feature of the particular content item, wherein one or more arguments of the support vector regression analysis correspond to one or more of the physical features of the particular content item and the physical features of the one or more previously published content items of the plurality of previously published content items, and an output of the support vector regression analysis comprises the predicted price; and
providing, by the one or more data processing apparatus, the predicted price to the requestor.

2. The method of claim 1, wherein the at least one physical feature of each of the one or more previously published content items is the same as the at least one physical feature of the particular content item.

3. The method of claim 1, wherein the particular content item comprises an advertisement and the requestor comprises an advertiser.

4. The method of claim 3, further comprising:
determining that the advertiser has offered to pay a price similar to the predicted price to a publisher of the particular physical publication to publish the advertisement;
determining a particular price agreed upon by the advertiser and the particular publisher to publish the advertisement; and
including the particular price in the plurality of features of the advertisement.

5. The method of claim 4, wherein the price similar to the predicted price is the predicted price itself.

6. The method of claim 4, wherein a physical publication is a newspaper, and wherein the method further comprising including the advertisement in the content items, the particular newspaper in the plurality of newspapers, and the plurality of features of the advertisement in the features of the content items.

7. The method of claim 1, wherein the actual prices of the previously published content items are obtained by:
tracking pricing negotiations between a plurality of entities providing the plurality of previously published content items and the plurality of publishers of the plurality of physical publications in which the plurality of previously published content items were published; and
storing prices agreed upon by the plurality of publishers and the plurality of entities to publish the plurality of previously published content items in the plurality of physical publications as agreed prices.

8. The method of claim 1, wherein each group includes one or more physical publications, physical features associated with content items previously published in the one or more physical publications and actual prices of the previously published content items, wherein a particular group includes the particular physical publication, the particular content item, and the physical features of the particular content item.

9. The method of claim 1, wherein one of the groups is a test group and remaining groups are training groups, the test group excluding the particular physical publication.

10. The method of claim 1, wherein physical publications in each group are distinct from each other.

11. The method of claim 1, wherein the physical features of the particular advertisement include one or more of a color of the particular advertisement, a column count, or a height of the particular advertisement.

12. A system comprising:
a receiver configured to perform operations including:
receive features of a particular advertisement to be published in a particular newspaper, and features of the particular newspaper in which the particular advertisement is to be published, the received features including physical features of the particular advertisement, each feature affecting a price of publishing the particular advertisement in the particular newspaper, and receive a request to determine a predicted price required to publish the particular advertisement in the particular newspaper;

a processor configured to determine a predicted price to publish the particular advertisement in the particular newspaper including dividing a plurality of newspapers into a plurality of groups, performing support vector regression analysis based on radial basis function kernels on the plurality of groups, and minimizing an error between the predicted price and actual prices previously accepted by a plurality of publishers for publishing a plurality of advertisements previously received from a plurality of requestors and previously published in the plurality of newspapers, one or more of the plurality of previously published advertisements having corresponding physical features substantially identical to the features of the particular advertisement, wherein one or more arguments of the support vector regression analysis correspond to one or more of the physical features of the particular advertisement and the corresponding physical features of the one or more of the plurality of previously published advertisements, and an output of the support vector regression analysis comprises the predicted price; and a transmitter configured to transmit the predicted price in response to receiving the request.

13. The system of claim 12, further comprising a repository to store the features of the advertisements including the physical features of the particular advertisement, the features of the particular newspaper, the actual prices, and the predicted price.

14. The system of claim 13, further comprising a price receiver to receive a price agreed upon to publish the particular advertisement in the particular newspaper, wherein the repository stores the price agreed upon.

15. The system of claim 12, wherein
each group includes features of one or more advertisements previously published in one or more newspapers included in the group and agreed prices for the one or more advertisements, wherein a particular group includes the particular newspaper and the features of the particular advertisement, the processor performs operations comprising:
selecting a group of the plurality of groups as a test group;
selecting remaining groups as training groups.

16. The system of claim 12, wherein the newspapers in each group are separate and distinct from each other.

17. The system of claim 15, wherein performing support vector regression analysis on the plurality of groups further includes:
creating a group that does not include the particular newspaper; and
selecting the created group as the test group.

18. The system of claim 12, wherein the physical features include an appearance of the particular advertisement, the appearance including one or more of a color, a column count, or a height of the particular advertisement.

19. The system of claim 12, wherein the features of the particular newspaper include a section, a category, an issue day, an issue type, and a circulation number of the particular newspaper.

20. A non-transitory computer-readable medium tangibly encoding software instructions executable to cause one or more computers to perform operations comprising:
determining agreed prices previously accepted by a plurality of publishers to publish a plurality of advertisements previously provided by a plurality of advertisers and previously published in a corresponding plurality of physical publications by the plurality of publishers, each previously published advertisement associated with a plurality of features including physical features;
receiving particular features of a particular advertisement for publishing in a particular publication, the particular features including particular physical features of the particular advertisement;
receiving a request to determine a predicted price to publish the particular advertisement in the particular publication;
dividing the plurality of physical publications into groups;
performing support vector regression analysis based on radial basis function kernels on the groups by comparing particular physical features of the particular advertisement with physical features of the plurality of previously published advertisements and minimizing an error between the predicted price and the agreed prices previously accepted by the plurality of publishers to publish the plurality of previously published advertisements, wherein each feature of an advertisement affects a price of publishing, and wherein one or more arguments of the support vector regression analysis correspond to one or more of the particular physical features of the particular advertisement and the physical features of the plurality of previously published advertisements, and an output of the support vector regression analysis is the predicted price; and
providing the predicted price in response to the request.

21. The computer-readable medium of claim 20, wherein determining agreed prices comprises, for each advertisement previously published in a corresponding publication:
tracking pricing negotiations between an advertiser providing each previously published advertisement and a publisher of the corresponding publication; and
receiving a price agreed upon pursuant to the negotiations.

22. The computer-readable medium of claim 20, the operations further comprising:
detecting an offering of the predicted price as an offer price to publish the particular advertisement in the particular publication;
tracking negotiations to arrive at a particular price to publish the particular advertisement in the particular publication; and
determining an error between the predicted price and the particular price.

* * * * *

UNITED STATES PATENT AND TRADEMARK OFFICE
CERTIFICATE OF CORRECTION

| | | |
|---|---|---|
| PATENT NO. | : 8,645,190 B1 | Page 1 of 1 |
| APPLICATION NO. | : 12/474132 | |
| DATED | : February 4, 2014 | |
| INVENTOR(S) | : Juda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 663 days.

Signed and Sealed this
Twenty-first Day of July, 2015

Michelle K. Lee
*Director of the United States Patent and Trademark Office*